United States Patent Office 2,912,378
Patented Nov. 10, 1959

2,912,378

METHOD OF TREATING OIL WELL FLOODING WATERS TO REDUCE SULFATE-REDUCING BACTERIA CONCENTRATION

George G. Bernard, Crystal Lake, Ill., assignor to The Pure Oil Company, Chicago, Ill., a corporation of Ohio No Drawing. Application June 19, 1956
Serial No. 592,246

5 Claims. (Cl. 210—52)

This invention relates to the production of mineral oil from underground strata and is more particularly concerned with the problems of sulfate-reducing bacteria in water, and the turbidity of same, for use in flooding oil wells and the use of water-drive in connection with the flooding of oil wells for the purpose of driving oil therefrom.

Many oil-field waters contain sulfate-reducing bacteria. These bacteria thrive in sulfate-containing waters and during the course of their metabolism reduce the sulfates to sulfides. The sulfides in turn are the direct or indirect cause of excessive pipe-line corrosion when such waters are transported about the field or transported with oil to gathering stations. The sulfides also plug water-injection wells, thereby necessitating expensive well-cleaning procedures.

Control of these sulfate-reducing bacteria in oil-field waters is presently accomplished by means of various bactericides and sterilizing agents such as chlorine. The duration of effectiveness of the prior art method of control is limited for various reasons, including the fact that special strains or species of bacteria are prone to develop which are immune to the chemical agents of bactericides employed. In accordance with this invention, a method has been devised for the control of bacteria in oil-field waters whereby no immunity can result. It has been found that by removal of the sulfate ion from the oil-field waters, an effective control of the bacteria can be accomplished. This can be done by adding a soluble barium or lead salt to the oil-field waters, thereby precipitating barium sulfate or lead sulfate. The sulfate-reducing bacteria do not thrive in the absence of appreciable quantities of sulfate. Also, it has been found that the barium or lead sulfate precipitates which form during the treatment, being very dense, settle rapidly and are instrumental in coagulating and clarifying the water. Thus, by a single treatment the oil-field waters can be clarified and freed of sulfate-reducing bacteria.

It becomes, therefore, a principal object of this invention to provide a process for the treatment of oil-field waters for the purpose of clarifying same and reducing the bacteria content thereof.

A second object of this invention is to provide a method of reducing the corrosivity of oil-field waters.

These and further objects of the invention will become apparent or be described as the description thereof proceeds.

The concentration of sulfate salts in oil-field waters may vary, depending upon the particular salts present, from about 0.01 g. per 100 cc. to about 1 g. per 100 cc. The concentrations of the sulfate ions in the connate, oil-field waters may run as high as 0.4 g. per 100 cc. In accordance with this invention, water-soluble salts which will precipitate low concentrations of sulfate ion, such as barium chloride, lead chloride, barium acetate and lead acetate, are added in aqueous solution or in solid form to the flood waters. The quantity of these water-soluble salts employed will vary in accordance with the concentration of sulfate ion present. It is only necessary to add a sufficient quantity of these water-soluble salts to precipitate, as insoluble barium sulfate or lead sulfate, substantially all of the sulfate present. The addition of the water-soluble salts reduces the concentration of the sulfate ion to less than about $5 \times 10^{-3}$ g. per 100 cc., since the solubility of lead sulfate ranges from $2.4 \times 10^{-3}$ g. per 100 cc. at 0° C. to $5.6 \times 10^{-3}$ g. per 100 cc. at 40° C., and the solubility of barium sulfate ranges from $1.15 \times 10^{-4}$ g. per 100 cc. at 0° C. to $2.85 \times 10^{-4}$ g. per 100 cc. at 30° C. For this reason, it is preferred that the water-soluble salt employed be a barium salt. In accordance with the present invention, it is possible to reduce the concentration of the sulfate ion down to the solubility limit of barium sulfate or lead sulfate at the temperature of the treated water by the addition of water-soluble salts of barium and lead, and it is seen that the food supply for the sulfate-reducing bacteria is substantially reduced, thereby appreciably curtailing their numbers and deleterious activities and by-products.

In order to demonstrate the invention the following example is given:

Example I

Flood water for a secondary recovery project is treated in a plant consisting essentially of an upflow clarifier and sand filters. The water contains 960 p.p.m. of sulfate ion and 1000 p.p.m. of turbidity. The maximum volume of water that the plant can clarify is 15,000 barrels per day. The water is clarified with 200 p.p.m. of lime and 100 p.p.m. of alum, but in spite of treatment with bactericides, sulfate-reducing bacteria cause corrosion of steel lines and plugging of water-injection wells.

The following water treatment produces very different results. The water is treated with 2200 p.p.m. of barium chloride, 100 p.p.m. lime, and 50 p.p.m. of alum, with no bactericide being used. The following beneficial results are obtained: (1) Even though the dosage of lime and alum are halved, the barium sulfate formed in the water facilitates the precipitation and separation of solids to such an extent that the capacity of the plant is increased from 15,000 bbls./day to 20,000 bbls./day. (2) Sulfate-reducing bacteria cease to be a problem in this water distribution system.

The sulfate-reducing microorganisms referred to in this application belong to the genus Desulfovibrio; a particular species commonly found in oil-field waters is *Desulfovibrio desulfuricans*.

In carrying out the invention, any metal salt which is relatively water-soluble and which forms water-insoluble sulfates without a buffering effect may be used. In addition to the barium and lead salts so far mentioned, the following salts may be used: barium perchlorate, barium di-gluconate, barium hydroxide, barium iodide, barium permanganate, barium nitrate, barium nitrite, barium dithionate, lead perchlorate, lead dichromate, lead fluosilicate, lead nitrate, lead dithiocyanate, mercury acetate, mercury chloride, mercury chlorate, mercury nitrate, strontium chloride, strontium lactate, strontium thiocyanate and strontium nitrite. To obtain the desired precipitation of the sulfate ion in the waters to be treated, the water-soluble metal salt may be added in solid form, preferably as a powder or granular, or in the form of an aqueous, concentrated solution. It is only necessary to determine by known methods the sulfate ion concentration of the waters to be treated and add at least a stoichiometric amount of the water-soluble metal salts, in solid or solution form, to furnish a sufficient concentration of metal ion to react with the sulfate ion and precipitate or coagulate same. Ambient temperatures are sufficient to bring about the efficient separation of the insoluble sulfate from the remaining aqueous phase. In some instances cooling or heating may be applied to facilitate the precipitation. After completion of the precipitation step, the sulfate-free, aqueous phase is readily separated by settling and decantation, filtering, centrifuging, or separation by means of baffles within a flowing stream of the water.

The process may be carried out in the ponds or tanks used to contain the flood waters and may be applied batch-wise or in a continuous manner. Various existing and known water treatment apparatus may be utilized in carrying out the invention. The water to be treated and the water-soluble salt may be mixed in a chamber, or by means of a pump, and conveyed to a settling basin before use in a given process such as treating a well to recover oil therefrom or from adjacent wells, in cooling systems in a refinery, or for other purposes where freedom from bacteria, corrosivity and turbidity are required.

Although the invention has been demonstrated by a combination treatment involving the use of lime and alum, which are known clarifying agents, the process may be carried out without the use of these materials. Lime and alum are generally useful additional treating agents where the turbidity of the flood water is about 1000 or more p.p.m. and reduce the cost of treatment by replacing part of the water-soluble sulfate-precipitating salts used in accordance with this invention. Where the turbidity is below about 750 p.p.m., treatment by use of the sulfate-precipitating salts alone is contemplated. Ordinary alum having the formula $KAl(SO_4)_2 \cdot 12H_2O$ formed by the evaporation of aqueous solutions of aluminum and potassium sulfates may be used as added clarifying agents. Chrome alums may also be used.

What is claimed is:
1. The method of treating turbid, sulfate-containing water for use in secondary oil recovery flooding operations to substantially reduce the sulfate-reducing bacterial concentration thereof, said water having a turbidity of above about 1000 p.p.m. and containing about 960 p.p.m. of sulfate ion which comprises adding to said water an amount of a mixture consisting of a water soluble metal salt selected from the group consisting of barium chloride, barium acetate, lead chloride and lead acetate, and a clarifying agent consisting of lime and alum to incorporate in the water about 2200 p.p.m. of said water soluble metal salt, about 100 p.p.m. of lime and 50 p.p.m. of alum and separating the water insoluble sulfate salt and clarifying agent from the water.

2. The method in accordance with claim 1 in which the water soluble metal salt is barium chloride.

3. The method in accordance with claim 1 in which the water soluble metal salt is barium acetate.

4. The method in accordance with claim 1 in which the water soluble metal salt is lead chloride.

5. The method in accordance with claim 1 in which the water soluble metal salt is lead acetate.

References Cited in the file of this patent

UNITED STATES PATENTS

| | | |
|---|---|---|
| 713,800 | Reisert | Nov. 18, 1902 |
| 1,547,111 | Finn | July 21, 1925 |
| 2,025,715 | Bird | Dec. 31, 1935 |
| 2,117,631 | Seyb | May 17, 1938 |
| 2,234,285 | Schworm | Mar. 11, 1941 |
| 2,300,693 | Oswald | Nov. 3, 1942 |
| 2,360,812 | Kelly et al. | Oct. 17, 1944 |

FOREIGN PATENTS

| | | |
|---|---|---|
| 186,278 | Switzerland | Dec. 1, 1936 |

OTHER REFERENCES

Scott: "Standard Methods of Chemical Analysis," 4th ed., vol. 1, Van Nostrand, N.Y., 1925, pp. 497–498.